US008104546B2

(12) United States Patent
Aeberhard

(10) Patent No.: US 8,104,546 B2
(45) Date of Patent: Jan. 31, 2012

(54) HAND-HELD POWER TOOL WITH TORQUE LIMITER

(75) Inventor: Bruno Aeberhard, Studen (CH)

(73) Assignee: Robert Bosch GmbH, Stuttgart (DE)

( * ) Notice: Subject to any disclaimer, the term of this patent is extended or adjusted under 35 U.S.C. 154(b) by 195 days.

(21) Appl. No.: 11/574,118

(22) PCT Filed: Oct. 19, 2005

(86) PCT No.: PCT/EP2005/055369

§ 371 (c)(1),
(2), (4) Date: Feb. 22, 2007

(87) PCT Pub. No.: WO2006/061286

PCT Pub. Date: Jun. 15, 2006

(65) Prior Publication Data

US 2009/0020301 A1 Jan. 22, 2009

(30) Foreign Application Priority Data

Dec. 7, 2004 (DE) ........................ 10 2004 058 809

(51) Int. Cl.
*B23Q 11/04* (2006.01)

(52) U.S. Cl. ....................................... 173/178; 173/176

(58) Field of Classification Search .................. 173/170, 173/176, 178, 216; 81/467, 473; 464/30; 192/56.61, 56.62, 150, 83; 475/263, 264
See application file for complete search history.

(56) References Cited

U.S. PATENT DOCUMENTS

| | | | | | |
|---|---|---|---|---|---|
| 2,446,363 | A | * | 8/1948 | Daum | 192/48.5 |
| 2,884,103 | A | * | 4/1959 | Connell | 192/56.53 |
| 3,398,611 | A | | 8/1968 | Hahner | |
| 3,774,738 | A | * | 11/1973 | Steinhagen | 192/56.57 |
| 3,893,553 | A | * | 7/1975 | Hansen | 192/56.57 |
| 4,263,996 | A | * | 4/1981 | Putney | 192/56.57 |
| 4,593,800 | A | * | 6/1986 | Ness et al. | 192/150 |
| 4,641,551 | A | * | 2/1987 | Pascaloff | 475/263 |
| 4,655,103 | A | * | 4/1987 | Schreiber et al. | 81/474 |
| 5,025,903 | A | * | 6/1991 | Elligson | 192/83 |
| 5,101,947 | A | | 4/1992 | Braun et al. | |
| 5,538,089 | A | * | 7/1996 | Sanford | 173/2 |
| 5,700,196 | A | * | 12/1997 | Banemann et al. | 464/36 |
| 5,868,231 | A | * | 2/1999 | Kampf | 192/56.5 |
| 5,897,454 | A | * | 4/1999 | Cannaliato | 475/265 |
| 6,142,243 | A | | 11/2000 | Mayer | |
| 6,739,225 | B2 | * | 5/2004 | Bader et al. | 81/475 |
| 6,799,666 | B2 | * | 10/2004 | Kampf | 192/56.54 |
| 2002/0096343 | A1 | | 7/2002 | Potter et al. | |

FOREIGN PATENT DOCUMENTS

| | | |
|---|---|---|
| DE | 103 09 057 | 9/2004 |
| EP | 0 437 060 | 7/1991 |

* cited by examiner

*Primary Examiner* — Lindsay Low
*Assistant Examiner* — Nathaniel Chukwurah
(74) *Attorney, Agent, or Firm* — Michael J. Striker

(57) ABSTRACT

The invention relates to a hand tool machine with a torque limiter (2) enabling a user to set a maximum torque which is transmitted by a motor drive (4) to a tool carrier (6). According to the invention, the hand tool machine comprises an overload clutch which interrupts a power flux between the motor drive (4) and the tool carrier (6) when the transmitted torque exceeds the overload torque.

10 Claims, 3 Drawing Sheets

HAND-HELD POWER TOOL WITH TORQUE LIMITER

CROSS-REFERENCE

The invention described and claimed hereinbelow is also described in PCT/EP 2005/055369, filed Oct. 19, 2005 and DE 10 2004 058 809.0, filed Dec. 7, 2004. This German Patent Application, whose subject matter is incorporated here by reference, provides the basis for a claim of priority of invention under 35 U.S.C. 119 (a)-(d).

BACKGROUND OF THE INVENTION

The invention is based on a hand-held power tool having a torque limiter.

Hand-held power tools, such as rechargeable-battery-operated screwdrivers, rechargeable-battery-operated power drills, or rechargeable-battery-operated percussion power drills, have a high drive torque, whose limitation is desirable for some applications. By means of an adjustable torque limitation, a number of screws can for instance be screwed into a workpiece with the same screwing-in torque, and a torque limiter unlatches as soon as the screws present a certain torque resistance to a motor power takeoff. For adapting the maximum torque to the task to be performed, the torque limiter is adjustable by a user.

From German Patent Disclosure DE 103 09 057 A1, a hand-held power tool with a torque limitation as described above is known. The maximum torque that is to be transmitted to the tool driver is adjusted by a user, and a torque limiter unlatches if the torque generated by the motor exceeds the set maximum torque. For shutting off or spanning the torque limiter, a drilling position is provided in which the torque limiter can no longer disconnect, and hence an uninterrupted flow of force between the motor power takeoff and the tool driver is assured, even if there is strong resistance on the part of the tool.

SUMMARY OF THE INVENTION

The invention is based on a hand-held power tool having a torque limiter, with which a maximum torque that is transmitted from a motor power takeoff to a tool driver is adjustable by a user.

It is proposed that the hand-held power tool has an overhead coupling, which interrupts a flow of force between the motor power takeoff and the tool driver when the transmitted torque exceeds an overload torque. Very high torques, for instance torques above 45 Nm that occur undesirably and can lead to a risk of injury to a user and to damage in the hand-held power tool, can be intercepted.

Typically, an adjustable maximum torque is between 1 Nm and 15 Nm, to make it possible for instance to screw quickly into wood without damage to the screws or wood. In drilling, sometimes greater torques must be transmitted, so that a drilling position is provided in which the hand-held power tool can be used up to its power limit, and an interruption in the torque by the torque limiter is impermissible. In this case, although greater working torques up to approximately 45 Nm can be intercepted by a user, nevertheless in the event of a sudden blockage such as from tilting of a drill in a drill hole, torques of above 75 Nm can briefly occur and are transmitted directly to the user. Until now, such torques were not typical in hand-held power tools with a torque limiter. To enable intercepting these high torques, the overhead coupling interrupts the flow of force between the motor power takeoff and the tool driver above an overload torque. Below an overload torque, a torque is understood to present a potential danger to the user. The overload torque is expediently above 45 Nm, and in particular above 55 Nm. The overload torque is advantageously preset and cannot be changed by a user and moreover is expediently preset regardless of a maximum torque of the torque limiter.

A reliably adjustable torque limiter that quickly comes unlatched can be achieved if the torque limiter interrupts a flow of force between the motor power takeoff and the tool driver when the torque exceeds the maximum torque. Advantageously, the torque limiter interrupts the flow of force between the motor power takeoff and the tool driver at a first coupling, and the overhead coupling interrupts the flow of force at a second coupling. Because of the independent disconnection of the flow of force by the torque limiter and the overhead coupling, the hand-held power tool can be designed especially safely, and the maximum torque can be kept easily adjustable.

In an advantageous refinement of the invention, the torque limiter has a spanning position, in which the torque transmissible by it is greater than the overload torque. The torque limiter can be adjusted or bridged independently of the overhead coupling, and as a result, easy operation of the torque limiter associated with great safety for a user can be achieved by means of the overhead coupling.

It is furthermore proposed that the overhead coupling includes an element which is an element of a planetary gear. Hand-held power tools with a planetary gear are typically embodied quite compactly. By the use of one element of the planetary gear as an element of the overhead coupling, the compactness of the hand-held power tool can be enhanced still further.

Another favorable feature with regard to compactness of the hand-held power tool is the use of an element which is an element of both the torque limiter and of the overhead coupling. Moreover, additional elements can be dispensed with, keeping the hand-held power tool inexpensive. The element is expediently an element such that at it, the flow of force from the motor power takeoff to the tool driver is interrupted by the torque limiter or the overhead coupling, and in particular by both the torque limiter and the overhead coupling.

Simple and hence economical assembly of the hand-held power tool can be attained if the torque limiter and the overhead coupling include spring elements that act in the same direction. In addition, a compact hand-held power tool can be achieved. For the sake of compactness of the hand-held power tool, it is also favorable if the direction is the axial direction.

The hand-held power tool can also be kept quite compact by placing the spring elements in a spring packet.

Especially dynamic adjustment of the maximum torque over a wide torque range can be achieved if at least the spring elements of the torque limiter are spiral springs of different lengths. Given the different lengths, a progressively increasing maximum torque with uniform indentation of the spring packet can be achieved especially simply.

Expediently, the overhead coupling in the spring packet has shorter spiral springs than the torque limiter. These shorter spiral springs can be embodied as quite taut and as a result, in the region in which the packet is compressed quite extensively, they can assure a very strong spring force of the packet, which is definitive for the overload torque. In this way, the overhead coupling and the torque limiter can be produced very compactly together.

In a further feature of the invention, the torque limiter includes an adjusting element with a control cam, which has a first segment for adjusting the maximum torque and a second segment, different in its control action from the first, for adjusting a drilling mode without adjustable torque limitation. The second segment of the control cam can for instance be embodied more steeply than the first, so that with a brief actuation of the adjusting element, a major change in the torque, from a maximum torque to a spanning position or to the overload torque, can be achieved. It is also possible to design the second segment as very low or without a change in torque, so that the adjusting element can be prevented from being forced out of the drilling mode setting unintentionally.

Low mechanical stress on the elements of the overhead coupling can be attained if the overhead coupling has a packet with a plurality of elements and with a prestressed spring element, and the initial tension is kept inside the packet. The packet is expediently defined by at least two elements, which are secured together, keeping the initial tension, in particular being secured to one another. High initial tension can be achieved in a space-saving way with a cup spring.

BRIEF DESCRIPTION OF THE DRAWINGS

Further advantages will become apparent from the ensuing description of the drawings. In the drawings, exemplary embodiments of the invention are shown. The drawings, description and claims include numerous characteristics in combination. One skilled in the art will expediently consider the characteristics individually as well and put them together to make useful further combinations.

Shown are.

DETAILED DESCRIPTION OF THE EXEMPLARY EMBODIMENTS

Figure 1:
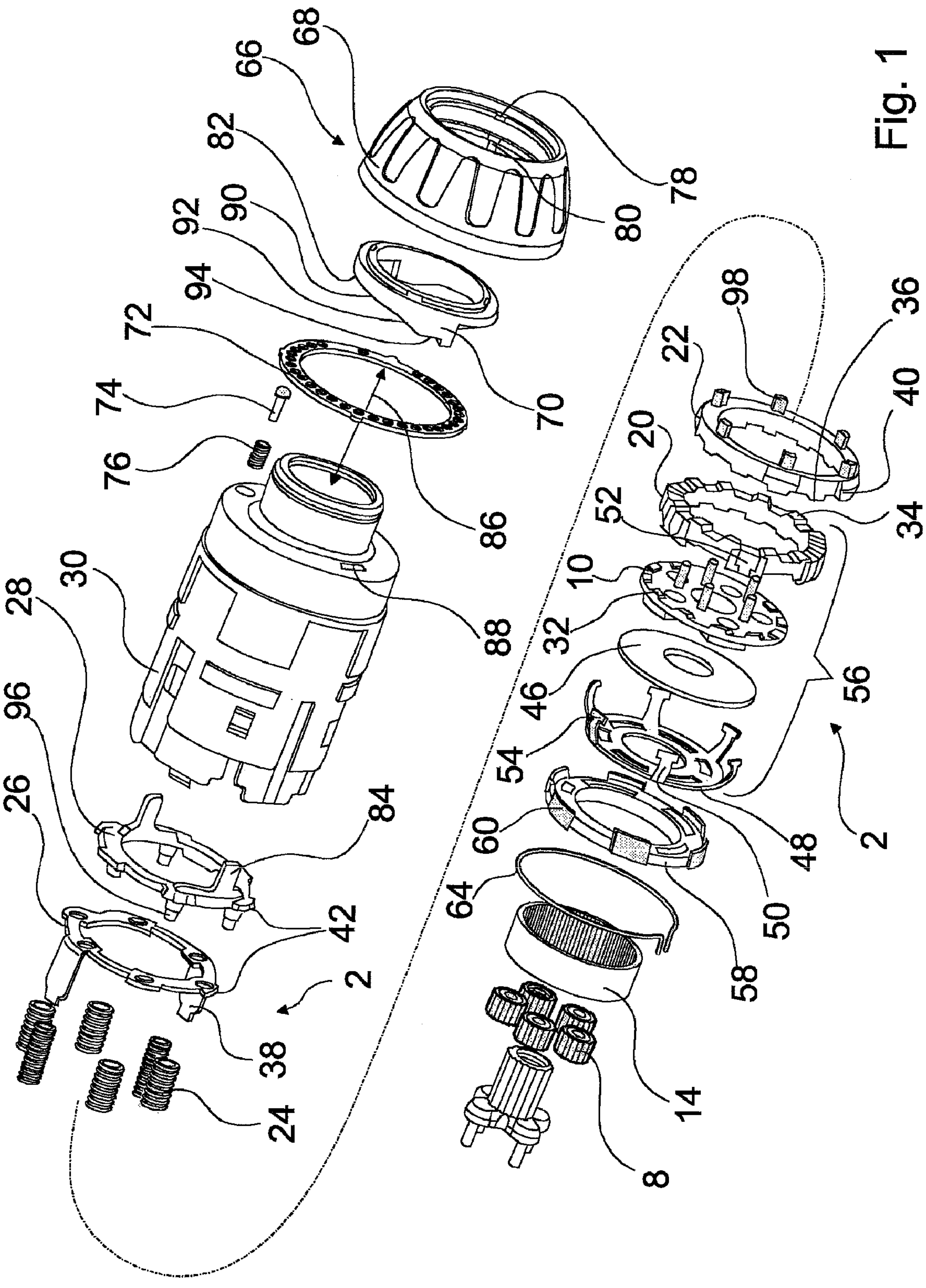
FIG. 1, a front part of a rechargeable-battery-operated screwdriver, having a torque limiter and an overhead coupling, in an exploded view.
Figure 2:
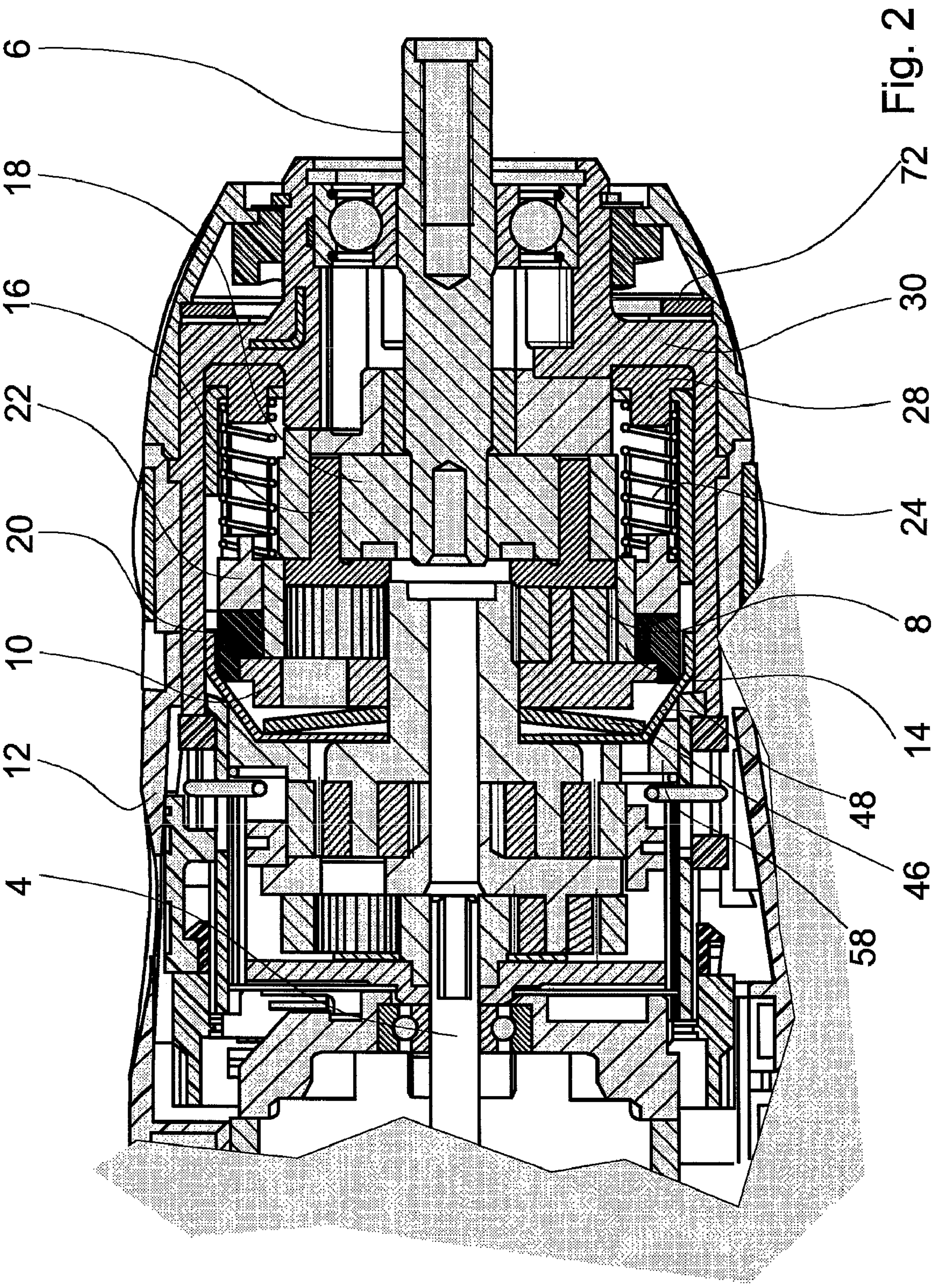
FIG. 2, the front part of FIG. 1, in a sectional view.

FIGS. 1 and 2 show a front part of a hand-held power tool, designed as a rechargeable-battery-operated screwdriver, in an exploded view (FIG. 1) and a sectional view (FIG. 2). The hand-held power tool includes a torque limiter 2, a motor power takeoff 4, and a tool driver 6. For driving the tool driver 6, a torque is transmitted from the motor power takeoff 4 to a three-stage planetary gear, with among other elements planet wheels 8, which consequently rotate about their own axis. The planet wheels 8 are supported on a planet carrier 10, which in the normal operating mode does not rotate with them or in other words is connected in stationary fashion to a housing 12 of the hand-held power tool. The planet wheels 8 drive a ring gear 14, whose internal toothing engages a slaving means 16 circumferentially and drives it. The slaving means 16 drives a star 18, and the star drives the tool driver 6 via a square socket.

Figure 3:
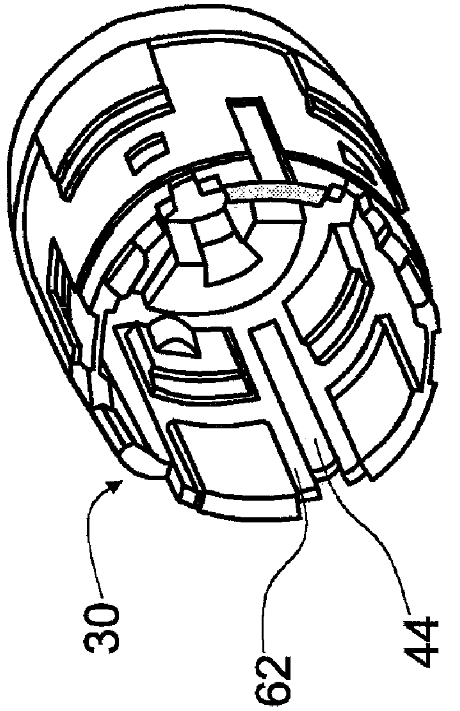
FIG. 3, a perspective view of a guide sleeve of FIG. 1.

In normal operation, the planet carrier 10 rests in stationary fashion relative to the housing 12. It is connected in a manner fixed against relative rotation, via two detent disks 20, 22, six spring elements 24, and two pressure pieces 26, 28, to a guide sleeve 30 which in turn is secured in a manner fixed against relative rotation to the housing 12 of the hand-held power tool. The connection in a manner fixed against relative rotation comes about via cams 32 of the planet carrier 10, which engage cams of the first detent disk 20; the first detent disk 20 is in turn connected to the second detent disk 22 by cams 34, which mesh with cams 36 of the second detent disk 22. The second detent disk 22 is in turn retained by arms 38 of the pressure piece 26 which engage between protuberances 40 of the second detent disk 22. The two pressure pieces 26, 28 are retained by protrusions 42 in internal grooves 44 (FIG. 3) of the guide sleeve 30.

On the gear end behind the planet carrier 10, there is a cup spring 46, which is placed in a holder 48. The holder 48, with arms 50, surrounds the cup spring 46 and the planet carrier 10 and engages pockets 52 in the first detent disk 20. The arms 50 are held in these pockets 52 by thickened portions 54, and the holder 48, under a tension with which the cup spring 46 is compressed to some distance is held on the detent disk 20 and clamps the planet carrier 10 between the cup spring 46 and the detent disk 20. The holder 48, cup spring 46, planet carrier 10, and detent disk 20 form a packet 56 that is subject to initial tension. The pressure force exerted by the cup spring 46 on the planet carrier 10 or retaining wheel 58 is kept inside the packet 56 by the arms 50 and the pockets 52 and thus do not have to be braced by the retaining wheel 58 or by a wire ring 64 in the guide sleeve 30. The retaining wheel 58 is located behind the holder 48 and, with protrusions 60, it engages internal grooves 62 of the guide sleeve 30 and is connected to the guide sleeve in a manner fixed against relative rotation and is also secured axially in the guide sleeve 30 by the wire ring 64.

For adjusting a maximum torque that is transmitted to the tool driver 6, the spring pressure of the spring elements 24 on the second detent disk 22 can be varied with the aid of an adjusting means 66. To that end, the adjusting means 66 has an actuating means 68, a cam ring 70, a perforated disk 72, a bolt 74, and a spring 76. A protrusion 78 and a groove 80 retain the cam ring 70 and the perforated disk 72 in the actuating means 68 in a manner fixed against relative rotation. Upon a rotation of the actuating means 68, the cam ring 70 is rotated with it; arms 84 that slide on a control cam 82 of the cam ring 70 assure a motion of the second pressure piece 28 in the axial direction 86. The arms 84 reach through recesses 88 of the guide sleeve 30 and are pressed, loaded by the spring force of the spring elements 24, against the control cam 82. Upon a motion of the second pressure piece 28 in the axial direction 86, the spring pressure of the spring element 24, with which the second detent disk 22 is pressed against the first detent disk 20, varies. Because of the placement of four shorter spring elements 24 between two longer spring elements 24, a progressive adjustment of the maximum torque with uniform shifting of the cam ring 70 can be achieved, as is described below in conjunction with FIG. 4. The perforated disk 72, with its holes that the bolt 74 engages in locking fashion, prevents an unwanted shifting of the actuating means 68 during the operation of the hand-held power tool.

In normal operation of the hand-held power tool, in which a torque below the set maximum torque is transmitted to the tool driver 6, the planet carrier 10 is at rest relative to the housing 12. If the torque on the tool driver 6 reaches the set maximum torque, then the second detent disk 22 is deflected, because of oblique flanks of the cams 34, 36, counter to the spring elements 24, and the first detent disk 20—and with it the entire packet 56—can rotate counter to the second detent disk 22. The connection in a manner fixed against relative rotation between the planet carrier 10 and the guide sleeve 30 is interrupted at a first coupling between the two detent disks 20, 22.

For spanning the torque limiter 2, the cam ring 70, in addition to a uniformly rising first segment 90 inside the control cam 82, has a second, more steeply rising segment 92 and a third, shallow segment 94 for achieving a drilling mode, which upon a rotation of the cam ring 70 causes no change in the spring pressure of the spring elements 24. Upon an adjustment of the spanning position, the arms 84 rest on the third segment 94 and are deflected maximally far in the direction of the motor power takeoff 4 of the hand-held power tool. The spring elements 24 are compressed to such an extent that pins 96, 98 that retain the spring elements 24 touch one another, and hence the detent disk 22 is held nondeflectably in the axial direction 86 between the detent disk 20 and the pressure piece 28. Overloading of the first detent disk 20 via the second detent disk 22—and thus a disconnection of the flow of force by the first coupling—is no longer possible. Moreover, the arms 38 reach between the pockets 52 in the detent disk 20, and as a result the detent disk 20 is connected to the guide sleeve 30 in a manner fixed against relative rotation.

In this position, a torque that is harmful to the hand-held power tool and dangerous to a user could be transmitted to the tool driver 6 by the torque limiter 2. To prevent the transmission of such a torque, an overhead coupling is located inside the packet 56 and interrupts the flow of force to the tool driver 6 if an overload torque is exceeded. If a torque which exceeds the overload torque is transmitted to the tool driver 6, the planet carrier 10 is deflected, by oblique flanks of the cams 32 and the cams of the detent disk 20, in the direction of the cup spring 46 and further compresses the cup spring 46, counter to its initial tension. The planet carrier 10 can now rotate counter to the detent disk 20, as a result of which the flow of force from the motor power takeoff 4 to the tool driver 6 is interrupted at a second coupling between the planet carrier 10 and the detent disk 20. While the detent disk 20 and the holder 48 are at rest in a manner fixed against relative rotation relative to the guide sleeve 30, the planet carrier 10 and optionally with it the cup spring 46 are in rotation.

The detent disk 20, as part of the packet 56, is thus part of the overhead coupling, which comprises precisely this packet 56, and also part of the torque limiter 2, which in addition further includes the pressure pieces 26, 28, the spring elements 24, and the detent disk 22.

Figure 4:
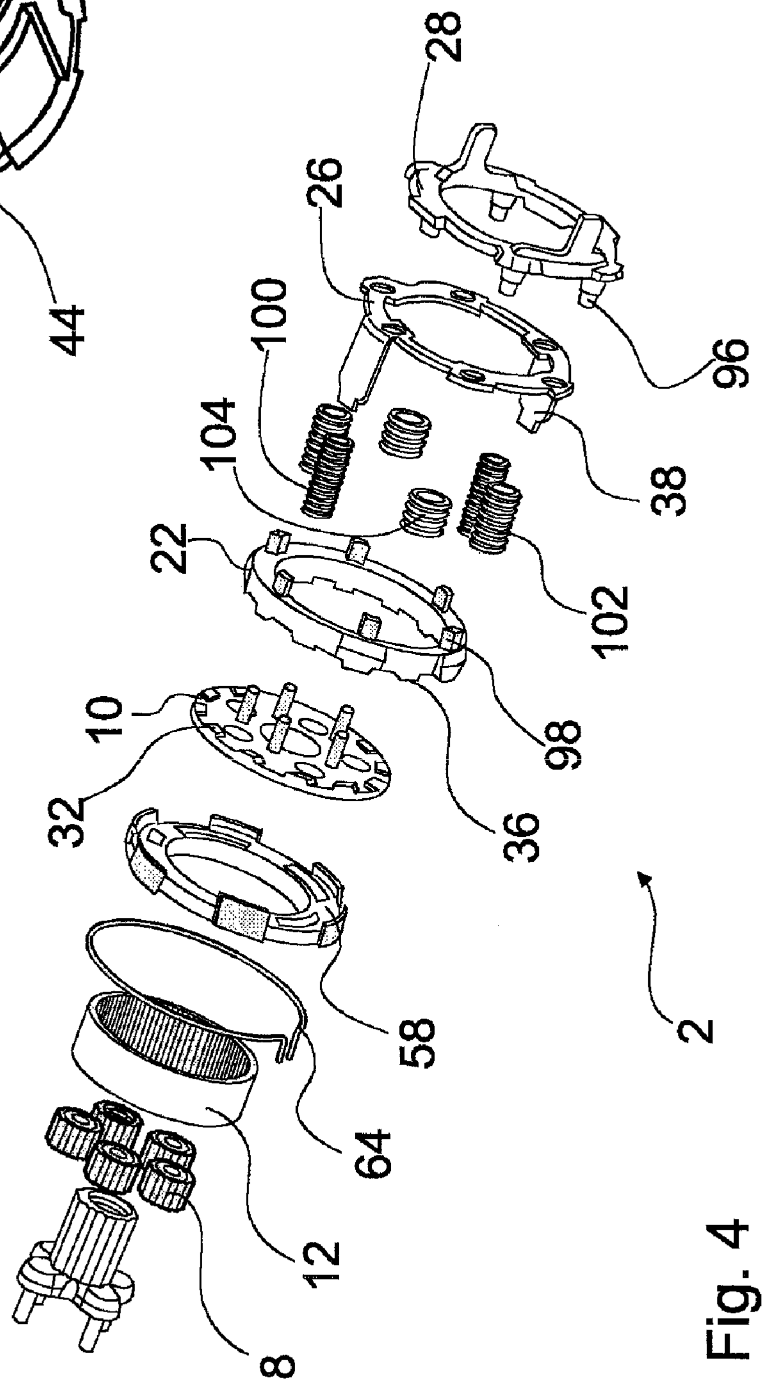
FIG. 4, an alternative arrangement of elements of a torque limiter and an overhead coupling.

In FIG. 4, an alternative arrangement of elements of a torque limiter 2 and an overhead coupling are shown. Components that remain essentially the same are basically identified by the same reference numerals. Moreover, for characteristics and functions that remain the same, the description of the exemplary embodiment in FIGS. 1 through 3 may be referred to.

Like the spring elements 24 in the exemplary embodiment of FIG. 1, spiral springs 100, 102, 104 are embodied with different lengths. Upon an adjustment of the least possible maximum torque by the cam ring 70, the longest spiral springs 100 are kept between the detent disk 22 and the pressure piece 26 with a slight initial tension. The maximum torque is adjusted to 1 Nm. Upon a rotation of the cam ring 70, the spiral springs 100 are first compressed, while conversely the next-shorter spiral springs 102 are located, still with a slight play, between the detent disk 22 and the pressure piece 26. Beyond a maximum torque of 4 Nm, upon a further rotation of the cam ring 70, the spiral springs 102 are compressed as well, so that the maximum torque, upon a uniform rotation of the cam ring 70, now rises faster, specifically up to a value of 20 Nm. The shortest spiral springs 104, even in this position, are also still located with play between the detent disk 20 and the pressure piece 26 and do not contribute to the force of the spring packet that comprises the spiral springs 100, 102 and 104.

Only upon an adjustment of the cam ring 70 to the drilling position, in which the arms 84 rest on the third segment 94, are the very short and very taut spiral springs 104 also compressed; however, a slight play still remains between the pins 96, 98. The maximum torque is now set to 55 Nm by means of the very taut spiral springs 104. The pressure force caused as a result by the spring packet of spiral springs 100, 102, 104, which is approximately 400 N, is absorbed inside the guide sleeve 30 by the retaining wheel 58 or the wire ring 64.

If the torque transmitted to the tool driver 6 reaches the overload torque, then the detent disk 22 is deflected by the oblique flanks of the cams 32, 36 in the direction toward the pressure piece 26, and the cams 32, 36 become disengaged. The flow of force from the motor power takeoff 4 to the tool driver 6 is thus interrupted at the same point where it is also interrupted by the torque limiter 2 in the event of a set maximum torque outside the drilling position.

The invention claimed is:

1. A hand-held power tool comprising a torque limiting unit which interrupts all flows of force from a motor power takeoff to a tool driver when a torque, which is transmitted from the motor power takeoff to the tool driver, exceeds a maximum torque, an actuating unit with which the maximum torque is adjustable by a user, and an overhead coupling, which interrupts all flows of force from the motor power takeoff to the tool driver, when the transmitted torque exceeds an overload torque in an operational mode of the hand-held power tool in which the torque limiting unit is bridged, wherein the torque limiting unit comprises a first coupling including first and second coupling elements (20, 22), wherein said first coupling element is configured as a first detent disk and said second coupling element is configured as a second detent disk, said torque limiting unit further comprising at least one first spring element, wherein said at least one first spring element is arranged on the tool driver end behind said second detent disk, and the overhead coupling comprises a second coupling including first and second coupling elements (10, 20), wherein said first coupling element is configured as a planet carrier and said second coupling element is formed by said first detent disk, said overhead coupling further comprising at least one second spring element, wherein said at least one second spring element is arranged on a gear end behind said planet carrier, wherein when the torque reaches said maximum torque said second detent disk is deflected counter to said at least one first spring element, and further wherein in said operation mode in which said torque limiting unit is bridged said second detent disk is held nondeflectably in an axial direction, and when the torque reaches said overload torque said planet carrier is deflected counter to said at least one second spring element.

2. The hand-held power tool as defined by claim 1, wherein the torque limiter (2) interrupts the flow of force between the motor power takeoff (4) and the tool driver (6) at a first coupling, and the overhead coupling interrupts the flow of force at a second coupling.

3. The hand-held power tool as defined by claim 1, wherein the torque limiter (2) has a spanning position, in which the torque transmissible by it is greater than the overload torque.

4. The hand-held power tool as defined by claim 1, wherein the overhead coupling includes an element which is an element of a planetary gear.

5. The hand-held power tool as defined by claim 1, wherein the torque limiter (2) and the overhead coupling include a common element.

6. The hand-held power tool as defined by claim 1, characterized in that the spring elements (24) are disposed in a spring packet.

7. The hand-held power tool as defined by claim 1, wherein the torque limiter (2) includes an adjusting element with a control cam (82), which has a first segment (90) for adjusting the maximum torque and a second segment (92, 94), different in its control action from the first, for adjusting a drilling mode without adjustable torque limitation.

8. The hand-held power tool as defined by claim 1, wherein the overhead coupling has a packet (56) with a plurality of elements and with a prestressed spring element, and the initial tension is retained inside the packet (56).

9. A hand-held power tool as defined in claim 8, wherein said packet (56) includes said element of said planetary gear, said coupling element (20) of said overhead coupling and a holder (48) for holding said spring element (46).

10. A hand-held power tool as defined in claim 1, wherein said element of said planetary gear is a planet carrier.

* * * * *